Patented June 9, 1953

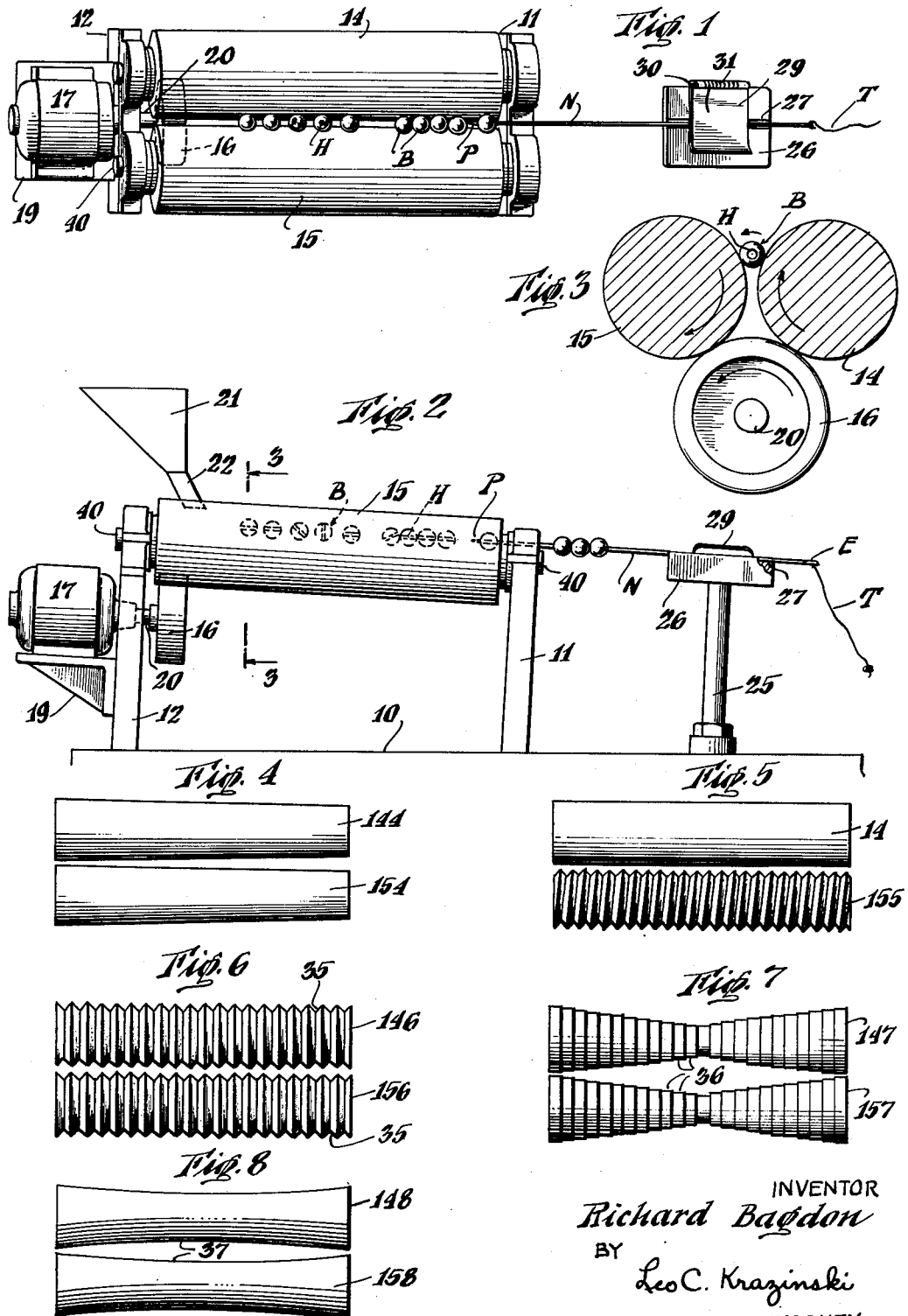

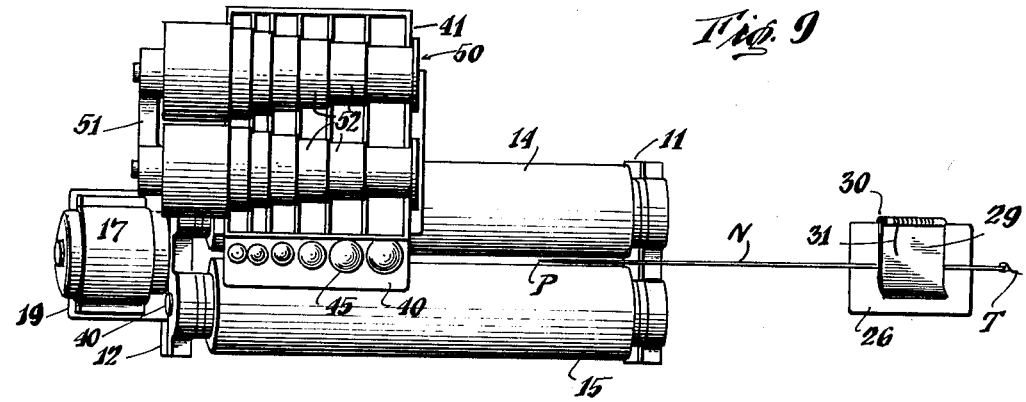
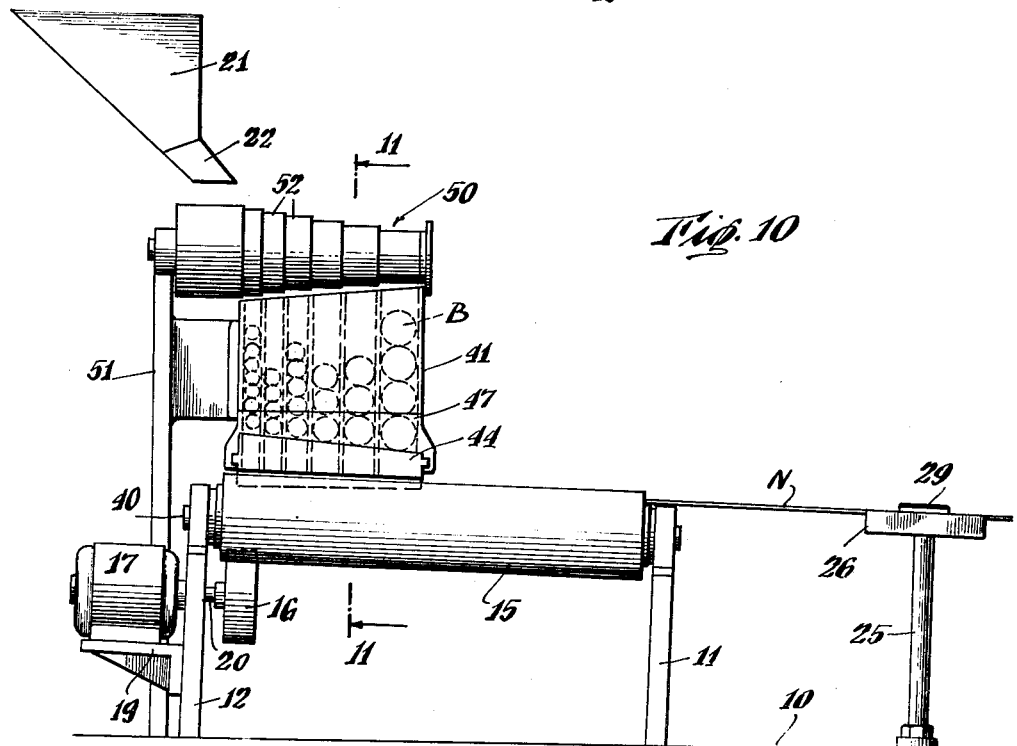
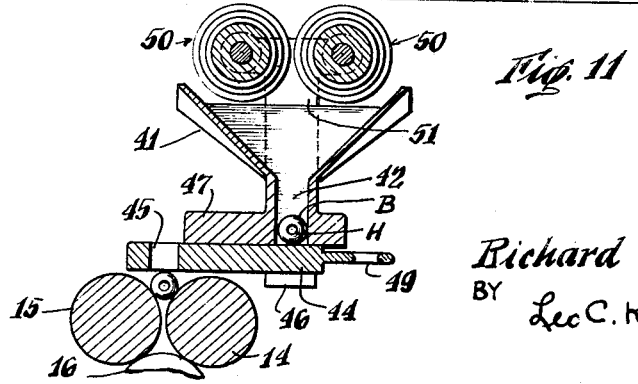

2,641,389

UNITED STATES PATENT OFFICE 2,641,389

BEAD THREADING MACHINE

Richard Bagdon, New York, N. Y.

Application February 28, 1948, Serial No. 12,061

12 Claims. (Cl. 223—48)

The present invention relates to apparel apparatus, and more particularly to the stringing of beads or the like.

The present invention aims to provide a machine for and method of stringing beads or the like wherein the beads are supported in a straight line and then rotated to cause the holes thereof to be aligned for the reception of bead stringing means such as a needle, stiffened thread, wire or the like. The invention contemplates feeding the aligned beads to the stringing means to effect automatic stringing thereof. The invention further aims to accomplish the foregoing while the beads are arranged according to size, for example, in graduated increasing or decreasing diameter, or in any other desired arrangement.

Accordingly, an object of the present invention is to provide a simple, economically constructed machine for accomplishing the foregoing.

Another object is to provide such a machine which is substantially automatic in operation and enables beads or the like to be strung at a rapid rate.

Another object is to provide such a machine which is rugged in construction and requires a minimum of manual supervision, maintenance and repair.

A further object is to provide an improved method of preparing beads for the stringing thereof.

A still further object consists in the construction and arrangement of elements for accomplishing the foregoing.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Figure 1 is a plan view of a machine in accordance with the invention;

Figure 2 is a side view, in elevation, of the machine shown in Figure 1;

Figure 3 is a sectional view taken along the line 3—3 on Figure 2;

Figures 4 to 8 are schematic plan views of various forms of means for effecting alignment and/or feeding of the beads;

Figure 9 is a plan view of a machine similar to that shown in Figures 1 to 3, but equipped with means for feeding the beads to the hole aligning means in a predetermined relation or arrangement;

Figure 10 is a side view, in elevation, of the machine shown in Figure 9; and

Figure 11 is a sectional view taken along the line 11—11 on Figure 10.

Referring to the drawings in detail, particularly to Figures 1, 2, and 3, there is shown a bead stringing machine comprising a base 10; a pair of spaced upright members 11 and 12 mounted on the base; a pair of substantially parallel spaced apart rolls 14 and 15 having their ends rotatably mounted on the upright members 11 and 12, respectively, and being constructed and arranged for supporting beads B therebetween; a rotatable member, such as a circular wheel or drum 16 beneath and in frictional engagement with the pair of rolls 14 and 15; and drive means for the drum 16, such as a motor 17 mounted on a bracket 19 supported by the upright member 12, the motor having a shaft 20 on which the drum 16 is mounted for rotation. In this manner, rotation of the rolls 14 and 15 in the same direction is effected by the drum 16, as illustrated more particularly in Figure 3.

If desired, a hopper 21 (Figure 2) may be disposed above the rolls 14 and 15 having an outlet 22 at the bottom thereof for delivering beads to the rolls.

In order to string the beads after the holes H thereof have been aligned by the foregoing described mechanism, as will become apparent hereinafter, the machine further comprises an upright member 25 mounted on the base 10 adjacent but spaced from the upright member 11, a platform 26 supported on the upper end of the upright member 25 having a groove 27 therein in alignment with the axis in which the holes of the beads are ultimately positioned, a needle N disposed in the groove 27 having its point P facing the rolls 14 and 15 and having a thread T or other stringing means extending through its eye E, a member 29 hinged to the platform 26, at 30 and a spring 31 (Figure 1) for urging the member 29 downwardly to engage and retain the needle in the groove 27.

As illustrated in Figures 1, 2 and 3, the rolls 14 and 15 are cylindrical in shape and are supported in inclined position, with their lower ends adjacent the needle, so that the beads are adapted to be fed by gravity with their openings in registration with the point of the needle. Alternatively, the rolls may be horizontally positioned and the needle may be moved to insert its point through the holes of the beads.

In Figure 4, modified rolls are illustrated. A pair of tapered or conical rolls 144 and 154 are constructed and arranged so that the space therebetween increases in the direction towards the needle. These rolls are adapted to support a series of beads of a gradually increasing diameter, for example, constituting the beads of a half necklace or the like.

In Figure 5, there are shown rolls 14 and 155, the former being cylindrical and the latter being in the form of a screw adapted to positively advance the beads towards the needle and cause the beads to be passed onto the needle.

In Figure 6, there are shown rolls 146 and 156 each having spaced annular grooves or recesses 35 for retaining the beads in their aligned positions against longitudinal movement along the rolls to thereby facilitate passing the point of the needle through the holes of the beads.

In Figure 7, rolls 147 and 157 are shown which have a compound taper along the length thereof, whereby the space between the rolls, from the left to the right as viewed, first increases and then decreases. The taper may be effected by a plurality of cylindrical zones 36 arranged in stepwise relation. Such rolls are adapted for aligning a series of beads of gradually increasing and decreasing diameter, for example, constituting the beads of a full necklace.

In Figure 8, rolls 148 and 158 are shown which have a compound taper or curvature provided by a smooth curved exterior 37 adapted to receive and align the beads of a full necklace.

It will be noted that the rolls 14 and 15 (Figure 2) are supported on the upright members 11 and 12 by pins or studs 40. These studs may be secured to the upright members in such a manner to facilitate easy removal thereof to thereby provide for selectively interchanging any of the forms of rolls illustrated in Figures 1 to 8. This enables the machine to fulfill numerous requirements and be used for a great variety of purposes.

In operation, the motor 17 rotates the drum 16 which causes the rollers 14 and 15 (or modifications thereof) to be rotated in the same direction. For example, as shown in Figure 3, the drum rotates in a counter clockwise direction, while the rolls 14 and 15 are rotated thereby in a clockwise direction, as indicated by the arrows. A threaded needle is positioned on the platform 26 with its point between the rolls at their ends adjacent the upright member 11, and beads are fed to the rolls from the hopper 21.

The beads are delivered to the space between the rolls, without regard to the position of their holes, and rotation is imparted to the beads by the rolls. No matter what the positions of the beads are, once the beads start to rotate the moment of inertia will move the beads into a position, whereby the axes in which the holes of the beads are disposed will be placed in a position parallel to the axes of the rotating rolls. All of the holes of the beads will be registered in this same axis, and, this being the same axis in which the needle is disposed, the beads are adapted to pass onto the needle or the needle is adapted to be inserted through the beads.

The motor preferably is operated at a rate of speed to effect rotation of the beads at a speed to cause rapid alignment thereof and to retain the alignment of the beads due to the centrifugal force or flywheel effect during the threading operation. The motor may be equipped with a variable speed control (not shown) which may be adjusted to rotate the beads at a desired speed depending upon their mass and moment of inertia.

The machine described herein is adapted to align beads having a great variety of shapes, and is in no way limited to spherical beads, as shown by way of example. For example, the beads may be cylindrical, ovoid, polyhedral, or may be in the shape of an annulus, and may have regular or irregular geometric shapes, the primary consideration being that the beads are bodies of revolution and have a hole through their center.

Referring now to Figures 9, 10 and 11 of the drawing, there is shown a machine, such as described in connection with Figures 1, 2, and 3, which is further improved by being provided with means for delivery of a series or set of beads arranged in accordance to size and constituting a half or full necklace or the like.

Such means, as illustrated herein, comprise a hopper 41, disposed above and to one side of the rolls 14 and 15 (Figure 11) having a longitudinally extending elongated outlet end portion 42 at the bottom; which is parallel to the axes of the rolls, a slidable plate 44 beneath the outlet of the hopper having a slot 45 for receiving a set of beads and delivering them to the space between the rolls, and means positioned across the hopper 41 for arranging the beads according to size. The plate 44 is guided between a support 46 and an extension 47 on the hopper, and is adapted to be reciprocated either manually or by mechanical means (not shown) operatively connected to the pusher arm or rod 49.

The bead arranging means comprise a pair of parallel, spaced apart, stepped rollers 50 extending across the hopper 41 and being rotatably supported by an upright member 51 secured to the base 10. If desired, these rollers may be rotated by the motor 17 through a suitable pulley and belt arrangement. The rollers, by reason of the steps or cylindrical zones 52, provide openings of different dimensions increasing in size from the left to the right, as viewed in Figure 9.

In operation, beads of different sizes are supplied to the rollers 50 by the outlet 22 of the hopper 21. The smallest beads will pass through the smallest opening at the left, the next size beads will pass through the next opening, and so on along the length of the rollers until the largest size beads pass through the largest opening at the right. The beads passing through the openings enter the outlet end 42 of the hopper 41 and are stacked therein in the aforesaid predetermined relationship (Figure 10), a single series of beads being deposited upon the rollers 14, 15 at each actuation of the plate 44, as described hereinbefore.

Alignment of the holes and stringing of the beads may be accomplished as described in connection with Figures 1, 2, and 3.

From the foregoing description, it will be seen that the present invention provides a simple, practical machine and method for arranging and/or aligning beads in a rapid and convenient manner to facilitate stringing thereof. The machine is adjustable for a great number of purposes and can be used in connection with a great variety of beads of numerous shapes, sizes, and materials. The machine is economical to construct and can be operated at a nominal cost while effecting a great saving of time and labor.

cost. The machine is rugged in construction and can readily withstand any rough usage to which it may be subjected.

As various changes may be made in the form, construction and arrangement of the parts herein, without departing from the spirit and scope of the invention and without sacrificing any of its advantages, it is to be understood that all matters are to be interpreted as illustrative and not in any limiting sense.

I claim:

1. In a bead stringing machine, the combination of a pair of substantially parallel, spaced apart rolls constructed and arranged in a substantially horizontal position to support beads having holes therebetween, means effecting rotation of both of said rolls in the same direction at a speed to cause said rolls to revolve the beads and by centrifugal force effect alignment of the holes of the beads, a needle for entering into and passing through the holes of the beads, whereby the beads are adapted to be strung thereupon, and a support for holding said needle with its axis in parallel relation to the axes of the rolls and with its threading end located between the rolls adjacent one of their ends.

2. In a bead stringing machine according to claim 1, wherein said rolls are of decreasing diameter along the length thereof for receiving and supporting a series of beads of different diameters.

3. In a bead stringing machine according to claim 1, wherein one of said rolls has substantially circumferentially extending grooves.

4. In a bead stringing machine according to claim 1, wherein both of said rolls have substantially circumferentially extending grooves.

5. In a bead stringing machine according to claim 1, wherein one of said rolls has substantially circumferentially extending grooves in the form of a screw.

6. In a bead stringing machine according to claim 1, wherein one of said rolls has substantially circumferentially extending grooves in the form of a screw and the other of said rolls is cylindrical.

7. In a bead stringing machine according to claim 1, wherein said rolls are of decreasing diameter from both ends towards the middle for receiving and supporting a series of beads of different diameters.

8. In a bead stringing machine according to claim 1, wherein said rolls are tapered.

9. In a bead stringing machine according to claim 1, including means for feeding beads to said rolls comprising a hopper above said rolls for receiving beads having an elongated outlet at the bottom thereof, a movable member between said hopper and said rolls having a slot adapted for receiving the beads from said hopper outlet, and means for moving said member to deliver the beads in said slot to said rolls.

10. In a bead stringing machine according to claim 1, including means for feeding beads to said rolls comprising a hopper above said rolls for receiving beads having an elongated outlet at the bottom thereof, means for placing the beads in said hopper in a predetermined relation, a movable member between said hopper and said rolls having a slot adapted for receiving the beads from said hopper outlet, and means for moving said member to deliver the beads in said slot to said rolls.

11. In a bead stringing machine according to claim 1, including means for feeding beads to said rolls comprising a hopper above said rolls, means for delivering the beads from said hopper to said rolls, and a pair of spaced apart elongated members extending across said hopper having zones constructed and arranged to form spaces between said members of varying dimensions and thereby permit beads of a given diameter to pass between said members at predetermined points along the length thereof.

12. In a bead stringing machine according to claim 1, including means for feeding beads to said rolls comprising a hopper above said rolls having an elongated outlet at the bottom thereof, a movable plate between said hopper and said rolls having a slot adapted for receiving the beads from said hopper outlet, means for moving said member to deliver the beads in said slot to said rolls, a pair of spaced apart substantially parallel members extending across said hopper having a plurality of cylindrical zones of varying diameter arranged to deliver beads of a predetermined size in a predetermined arrangement to said hopper.

RICHARD BAGDON.

References Cited in the file of this patent

UNITED STATES PATENTS

| Number | Name | Date |
|---|---|---|
| 190,693 | Sharp | May 15, 1877 |
| 1,813,088 | Segschnider | July 7, 1931 |
| 1,928,676 | Segschnider | Oct. 3, 1933 |
| 2,092,486 | Wells | Sept. 7, 1937 |
| 2,557,854 | Adam | June 19, 1951 |

FOREIGN PATENTS

| Number | Country | Date |
|---|---|---|
| 21,192 | Great Britain | Nov. 22, 1892 |
| 534,524 | France | Jan. 7, 1922 |